June 5, 1956 N. MALZ 2,749,427
COOKING UTENSIL
Filed Sept. 23, 1952 3 Sheets-Sheet 3

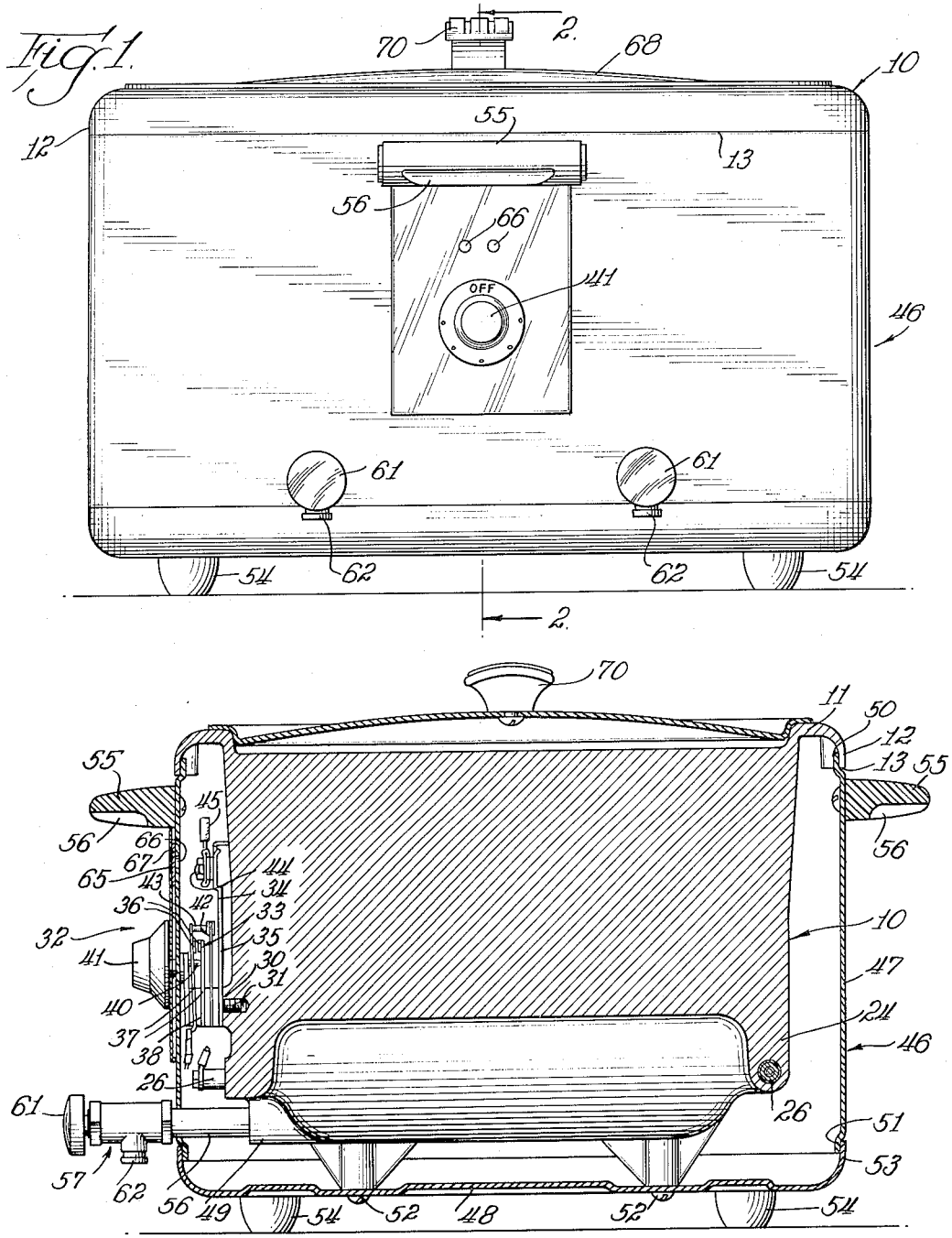

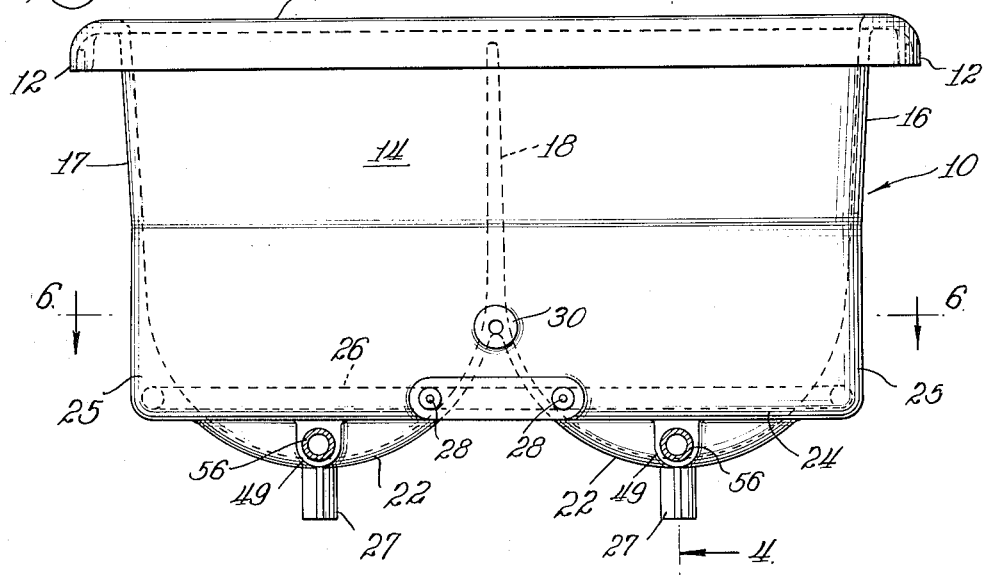
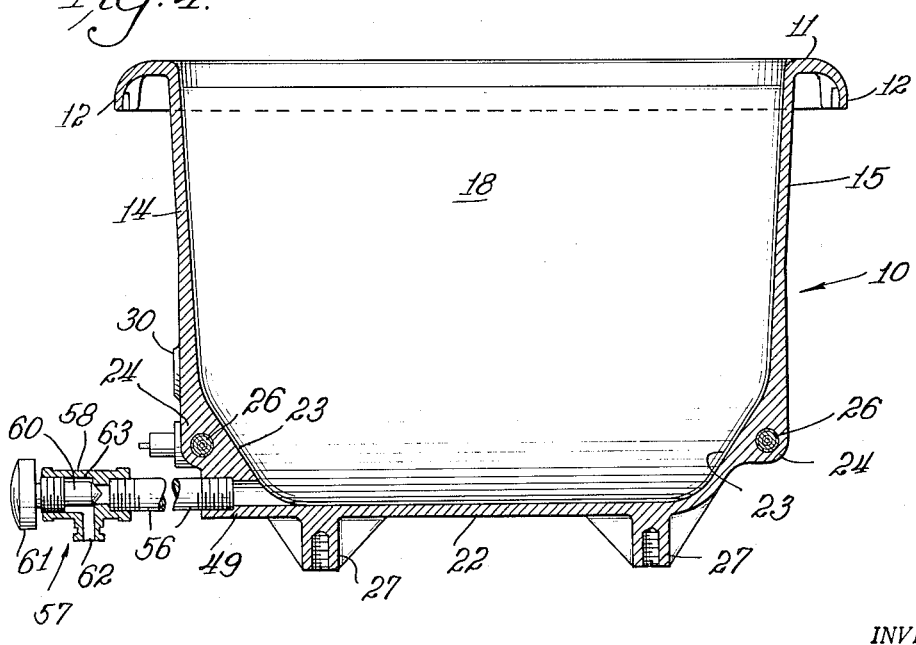

INVENTOR.
Nickolas Malz
BY
Watson D. Harbaugh
Atty.

United States Patent Office 2,749,427
Patented June 5, 1956

2,749,427

COOKING UTENSIL

Nickolas Malz, Chicago, Ill., assignor to Dormeyer Corporation, Chicago, Ill., a corporation of Illinois Application September 23, 1952, Serial No. 311,104

3 Claims. (Cl. 219—44)

This invention relates to cooking utensils and particularly to a device for cooking food in hot oils, fats or water, generally referred to as deep fat fryers.

One of the objects of the present invention is to provide a deep fat fryer which will handle from 3 to 8 pounds of oil for either home or restaurant use, which can be plugged into the usual electrical outlet receptacle without violating any electrical codes with respect to wattage load limitations, and yet provides a rapid warmup and a constant temperature factor of high uniformity under widely varying conditions, including the use of as little as 3 pounds of oil and a full cooking load, and 8 pounds of fat with a light load.

One of the difficulties heretofore experienced with deep fat fryers is the maintenance of an even temperature throughout the working cycle of the deep fat fryer, so that the cooking time and the results attained can be standardized and recipes specified without any deviation being required therefrom for optimum results.

When a cold charge of food is placed in hot fat, heat is absorbed from the hot fat quite rapidly and it is highly desirable that the heat deficiency be remedied as quickly as possible, so that the cooking cycle prescribed by recipe will remain a constant one.

In the present invention the thermal requirements are met in two ways, namely, (1) by accelerating circulation of the fat itself between the cooling load and the source of heat, so that the cooled fat is replaced with hot fat before the temperature drop of the fat around the food becomes substantial, and, (2) by thermostatically energizing the heater, the moment that there is an appreciable loss of temperature, by bringing the cooled fat into effective heat-exchange relationship with the thermostat immediately subsequent to the time or instant that the cooled fat has delivered the thermal units to the cooking load.

Much difficulty has also been experienced in the past with deep fat fryers which become too hot while they are operated upon standby service. The heat present around the heater at the time the thermostat de-energizes the heater is sufficient to overshoot the desired upper temperature limit for best cooking operations, it being appreciated that temperatures above that prescribed for best cooking results in a particular recipe are as undesirable as temperatures which are too low.

One of the objects of the present invention is to eliminate these difficulties and provide a device which not only maintains cooking oil or fat within a few degrees of a selected temperature so that the results of predetermined recipes can be repeated in the laboratory, home and restaurant unerringly, but also that the same can be accomplished regardless of the amount of fat that is employed in the device.

A further object of the invention is to provide a double-cavity deep fat fryer with a source of heat disposed in all of its outer walls, yet with the thermostat located where it is responsive to the coolest portion of the oil at a point where the oil passes by immediately following the transfer of heat from the oil to the cooking load.

A further object of the invention is to create and dispose a concentration of heat at one wall of a deep fat frying well so that the higher heat-exchange relationship at that wall will force circulation of the coolest portion of the hot oil into contact with the wall opposite, with which wall the thermostat is disposed in heat-exchange relationship to respond to the heat present in that wall.

Another object of the invention is to maintain a constant and direct heat-exchange contact between the metal body of a deep fat fryer and an electric heating element of large capacity without danger of flashing the fat if the fat is placed in the container after the heat has been turned "on."

A further object of the invention is to provide a cooking oil or fat handling device which settles out sediment and floating particles when being drained to permit repeated use of the oils or fats in a clean and pure condition.

A further object of the invention is to provide a two-well deep fat fryer which will operate as a single-well deep fat fryer with either well when desired, yet when both wells are utilized the heat present in the fat of one well will supplement the heat present in the other well through a common wall of high heat conductivity with the alternate application of cooking loads to the respective wells.

A further object of the invention is to provide a heat control responsive to the temperature existent in the unheated common wall between two deep fat frying wells in relationship to the cooking load placed in the respective wells.

Another object of the invention includes the construction and arrangement of parts which are easy to keep clean, simple and inexpensive to manufacture and service, easy and efficient in operation and capable of complete understanding merely from observation by users not skilled mechanically, further objects being apparent from the drawings, the description relating thereto, and the appended claims.

Referring to the drawings generally:

Fig. 1 is a front elevation of a cooking device embodying the invention.

Fig. 2 is a medial, longitudinal section of the device taken upon line 2—2 of Fig. 1.

Fig. 3 is a front elevational view of the casting embodied in the invention shown in Fig. 1.

Fig. 4 is a section taken upon line 4—4 of Fig. 3.

Throughout the several views like numbers refer to like parts.

Figure 5:
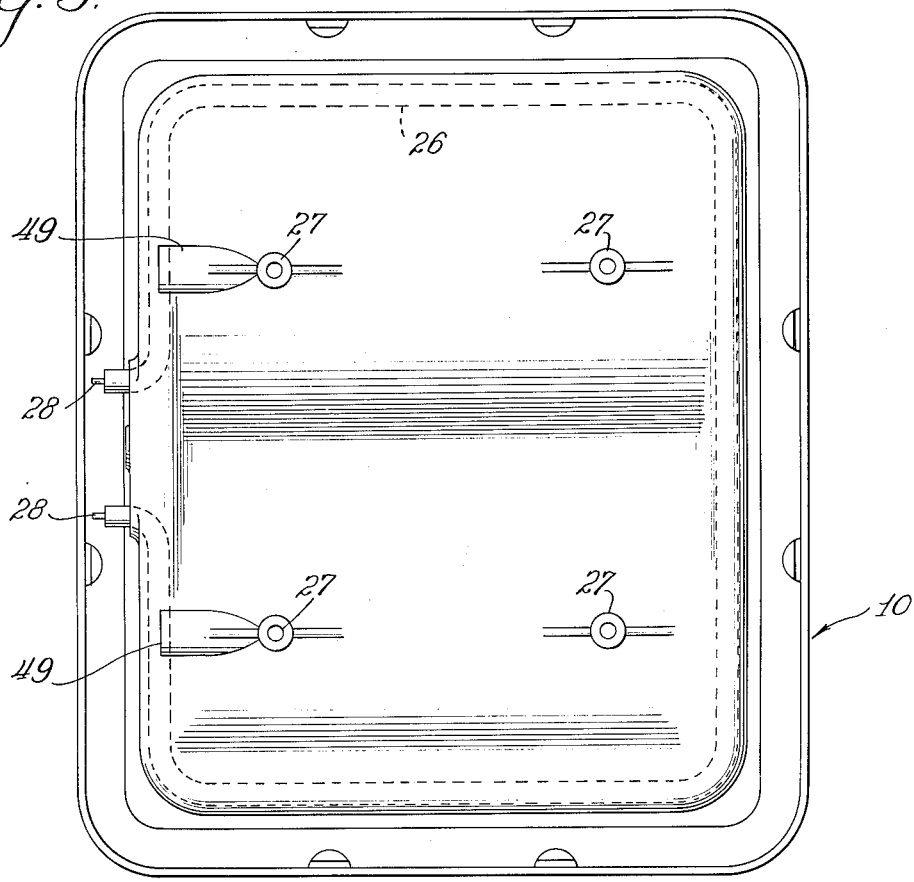
Fig. 5 is a bottom view of the casting shown in Fig. 3.

Referring now to the drawings in further detail, the embodiment of the invention shown in the drawings contemplates a substantially square aluminum die-cast vessel with an extra mass of metal stock bounding the bottom of all four sides, in which mass a "Calrod" type electric heater is embedded at the time the vessel body is cast. The ends of the heater terminate at space points in front of casting and the interior of the vessel is divided into two wells by a medial wall extending from the front to back of the casting. Where the bends of the heater coincide with two adjacent corners of the vessel there is less metal stock at these points per lineal unit of heater length so that a higher heat application is concentrated at these points than in the wall between them. This concentration of heat is found along the side walls opposite the dividing wall and forces convected circulation of cool fat down along the dividing wall remote therefrom. At one end of the medial wall, preferably at the front of the device, a thermostat is mounted on the outside away from the heater and upon metal contiguous to the metal present in the medial or dividing wall. In this position the thermostat responds to heat radiated from the wall of the vessel proximate to it as well as heat conducted through the metal of the mounting bracket from the wall to the thermostat.

In the preferred embodiment of the invention the upper edges of the casting are shaped to have an outwardly and downwardly extending flange, which interlocks with the upper edge of the vertical side wall of the housing in an overlapping relationship which prevents grease or cleaning fluid from entering inside the housing.

The thermostat is an adjustable one and can be any one of a number of conventional constructions provided the bimetal member is disposed proximate to the vessel wall and at its mounted end is placed in metal heat conducting contact with the vessel wall at the end of the dividing wall. Preferably above the thermostat where the infra red ray thereof may strike the bimetal, is located a bare wire glow coil connected in series with the heater. This coil causes the thermostat to anticipate the heating and cooling of the heater and vessel respectively, and in conjunction with a cover of low heat conductivity, maintains the temperature of the oil in the vessel at a substantially constant level.

A drain through each of the front wall portions of both wells is provided below the heater at that point to permit removal of the hot fat from a cool area where the liquid is comparatively quiet and any foreign particles in the cooling oil have settled out. This eliminates any danger of hot fat coming in contact with the upper metal edges of the vessel when leaving the vessel or contacting any particles or damp crumbs clinging thereto, sputtering, and causing burns or the dangers of dropping the vessel which accompany deep fat fryers built to be tipped like a bucket when drained.

Figure 6:
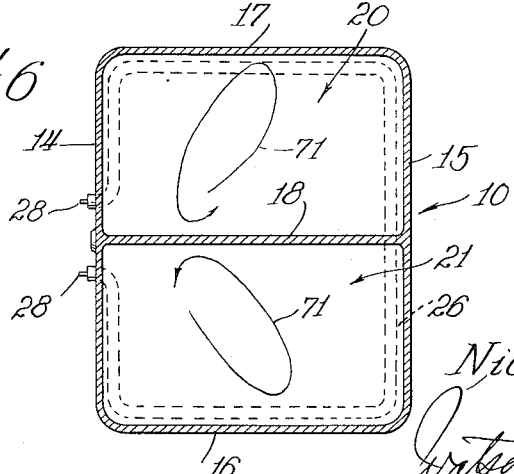
Fig. 6 is taken upon line 6—6 in Fig. 3.

The vessel comprises a unitary casting 10, preferably made of die-cast aluminum. The upper edges 11 are flanged outwardly and downwardly as at 12 to terminate in an edge 13 comprising the parting line of the die. As best shown in Fig. 6, the outside walls comprise the front wall 14, the back wall 15, and the right and left-hand walls 16 and 17, respectively; a dividing wall 18 interconnects the front and back walls 14 and 15 to divide the included space into two wells 20 and 21. The walls are of cast thickness as shown and converge in a downward direction on the outside and are so inclined or tapered on their inside faces as to provide draw tolerances for the forming dies.

Internally the walls 16, 17 and 18 are connected by cylindrically shaped bottom walls 22, whose axis extends from the front to the back of the casting. The inside surfaces of the walls 14 and 15 slope inwardly as at 23, to prevent any collection of sediment on any of the walls above the lowest point of the well.

The outside surfaces of all the walls have their contour carried down far enough to provide a mass of metal stock as at 24 in the front and back walls and as at 25 in the side walls to receive embedded therein when the body is cast a metal-encased unitary heating element 26, referred to very often as a "Calrod" or mono-rod. The element 26 comprises a metal alloy tubing surrounding a heater element encased in a heat-conducting electrically insulating refractory material. Bosses 27 extending downwardly from the bottoms 22 are threaded to receive screws 52 therein employed to hold the assembly together, which includes the bottom member, the side housing and the casting, in a manner hereinafter described.

Figure 7:
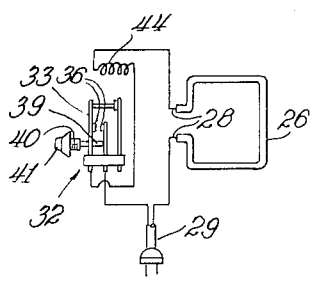
Fig. 7 is a schematic wiring diagram of the device shown embodying the invention.

As shown in the views of Figs. 6 and 7, the heater 26 is bent to a rectangular form with its ends turned outwardly in the middle of one side which side is preferably the front side. The electrical terminals of the heater elements are indicated at 28, which are connected to the normal alternating house current of a 110 volts through a cord 29 in series with a thermostatically controlled switch 32, which as shown in Fig. 2, is mounted in close proximity thereto upon a boss 30 as held in place by a screw 31.

The thermostat 32 includes a switch 33 carried by a mounting plate 34. Preferably the mounting plate has a window 35 through the center portion to determine the area of the wall 14 adjacent thereto, which is effective upon the bimetal strip for the radiation of heat. Two electrical make-and-break contacts 36 carried by leaf spring 37 are clamped together at their base on a sleeve rivet (not shown) with electrical insulating washers 38 between them. The leaf springs normally urge the contacts to make contact but one of them is adjustably moved away from the other by a handset control shaft 40 carrying a dial knob 41, having temperature indicia thereon at one end and a dielectric thrust pin 39 engaging the spring at the other end. The other spring is subjected to the deflection of the bimetal member 42 through an intermediate dielectric pin 43 carried by the bimetal.

In one position of the dial the first spring and contact are depressed inwardly far enough to separate the contact members under all possible conditions, and this position is utilized as the "off" position. When the dial is turned to any other predetermined position registered thereon in temperature readings, the two contacts are permitted to come together as an initial or resting position to close a circuit which includes in series therewith a glow coil 44, mounted above the thermostat and connected by leads 45 in series with the switch contacts 36 and in series with the heater 26 across the house line by the extension cord 29.

As will be seen from the drawings, the glow coil 44 is located just above the upper end of the bimetal member 42 and is disposed where its radiation is mainly edgewise to the bimetal member where its heat effect is essentially confined to the upper portion of the bimetal while the main part of the bimetal is exposed to crosswise radiation of heat from the wall 14 through the control or window opening 35. The base portion of the bimetal member is shielded from the wall 14 and receives little if any radiation from the glow coil. Its sensible heat is essentially that which is conducted to it through the stud 31 in heat conductive contact with the wall 14.

As the temperature of the vessel 10 rises when the contacts 36 are closed, the temperature will approach the temperature set for the vessel by the dial, but in addition to the heat conducted to it through the stud and the heat radiation from the wall of the vessel, the thermostat receives radiated heat from the glow coil whose heat is much higher than the vessel wall. This higher heat effect gives an anticipating action to the thermostat. The sum of these three heats causes the thermostat to break contact before the desired temperature is reached in the vessel and after the current is cut off, the higher heat which has been concentrated in the heater itself and not yet dissipated, is conducted to the surrounding stock of the vessel, thereby carrying the temperature thereof up to the desired temperature shortly after the thermostat switches have opened.

Then when the current is cut off by the thermostat opening the contacts, the glow coil cools off and its contribution of radiated heat is lost. The effective cooling of the bimetal will be accelerated ahead of that of the vessel and the contents of the vessel, whereupon the heater is again turned on before the temperature of the vessel falls appreciably from heat loss due to cooking or radiation. This anticipating action of the thermostat is superposed upon the normalizing heat radiation effect which is continually present because of the aperture-controlled radiation from the vessel wall, and the heat conduction through the mounting post and sleeve.

Thus over the main upper portion of its body, the bimetal member is steadily exposed to radiated heat from the vessel; the mounted end absorbs only heat conducted to it remotely from the nearest portions of the heater at the near-bottom corners where the heater element is bent outwardly; and the free end of the bimetal is exposed to a widely varying heat radiation effect. The flexing end of the bimetal adjacent to the mounting stud accomplishes wide movement of the contact driven thereby, whereas bending near the free end has a minimized effect, thus making it possible to employ a rugged glow coil element at this point for that purpose without delicate adjustment, tolerances or operation.

The housing for the vessel indicated generally at 46 comprises two stampings, a side member 47 and a bottom member 48. The upper and lower edges of the side member 46 are offset inwardly as at 50 and 51. The bottom member 48 has a closed horizontally disposed central portion offset according to a pattern intended to reinforce it against "oil-canning" apertured to receive screws 52 which engage in the threaded openings 24 on the vessel bosses 27. At its edges the bottom member is rounded into vertical flanges 53 of the same shape and dimensions as the flanges indicated at 12 and 13.

The upper offset 50 is received within and behind the flange portion indicated by the numerals 12 and 13 of the casting at the upper edge. The lower offset portion 51 along the bottom edge of the vertical wall housing 46 is received in back of the edge of the flange 53 on the bottom member and the three elements are held in assembled relationship under compression exerted by the screws 52 when tightened in place.

Feet 54 are secured to the bottom member to support the assembly well above the table top so that the device can be used elsewhere than in a kitchen without marring or discoloring the table top. Handles 55 are provided on the front and back walls for handling the device, the handles being provided with depressions indicated at 56 which assist the user in locating the fingers of a hand in a weight bearing position without contacting any of the warm parts of the housing should the fryer be left on long enough prior to handling for it to become operatively warm.

At the lowest point in both wells the walls 22 are provided with bosses 49 below the heater level, which are apertured and threaded to receive a pipe nipple 56 extending outwardly through the corresponding wall of the intermediate housing member 46. As is shown in Fig. 2, a needle valve 57 is mounted upon the other end of the nipple 56 and comprises a body member 58, a valve stem 60 threaded in the body, a handle 61 on the valve stem, and a drain nozzle 62. The valve compartment 63 and the stem 60 are in axial alignment with the passage through the nipple so that if the passageway or valve ever becomes blocked it can be cleaned out by a straight brush or instrument, and visual inspection can determine whether such is accomplished. The nozzle is press-fitted into a side opening 64 disposed normal to the valve compartment, and if this becomes clogged it is accessible from both ends for cleaning purposes when the valve is removed.

It is appreciated that the solid particles in the fat will settled in the lowermost portions of the well on the wall 22, where they will remain while the grease is being drained out of the vessel through the valve 57. The drain opening is restricted to a drainage capacity below that which would cause a dislodgement of the solid particles in the direction of the drain opening when draining, yet all but a few drops can be recovered, leaving the solid particles to be wiped out when the vessel is cleaned.

As viewed in Fig. 4 it will be noted that the nipple 56 as received in the boss 49 is very close to and in metal-to-metal heat exchange relationship with the heater 26. It has been found that housewives and restaurant owners procrastinate with regard to purifying the oil. Instead of purifying the oil in many cases right after the use, the deep fat fryer is turned "off" and the oil permitted to cool and solidify before any thought is entertained of purifying the oil. The oil is then purified if at all just before the next cooking operation and after the apparatus has warmed up.

It has been discovered in the present invention that with the nipple 56 located where it is it will obtain heat by short and direct conduction from the heater through the intermediate metal and will be one of the first elements to warm. In fact, the valve will be heated by conduction to a sufficient temperature to liquify any oil therein at the same time that the oil begins to melt in the vessel. Thus the oil can be drained as it progressively melts so that neither vessel nor any part of the oil is brought to any more than a mild warmth before the vessel is drained of the oil, leaving the sediment behind. The vessel at this time is still comparatively cool for wiping out the sediment and cleaning. Thereafter the valve can be closed and the purified oil returned to the vessel, the heater turned "on" again and the oil heated to its operating or cooking temperature.

As already mentioned, the dial 41 is calibrated for temperature control, and appropriate indicia thereon is provided. The upper heat limit is preferably 450° F. in order to prevent the temperature reaching the flash point of any oils available for use, and the calibration includes 200° F. so that water can be used in the device and kept just below the boiling point for such culinary operations as "hard-boiling" or poaching eggs, etc. The dial also includes a calibration identified as "Drain" at approximately 110° F. A decorative plate 65 supports the dial and closes an access opening.

Just above the dial two openings 66 in the plate have mounted behind them a frosted glass pane 67 in visual alignment with the glow coil 44, so that the user can tell at a glance when the heater is "On" or "Off," thus providing visual evidence that the device is plugged in and fully operating, as well as providing the anticipating control effect already described. Also, when the glow coil goes "out" the first time after plugging in the device, the user can, without guessing, or without a timer, determine that the device is ready for cooking operations at the set temperature.

Any suitable food conveying or handling device such as a wire screen basket (not shown) and/or perforated dish or cup may be submerged in the cooking oil, and suitable supports (not shown) supplied as more particularly described in the Braski et al. Patent No. 2,597,695, reference to which is hereby made for handling the food in the oil.

In the embodiment as shown in Fig. 1, a die-stamped cover plate 68 is provided with the marginal edges pressed upwardly and outwardly to nest on the upper flanged edges 11 of the vessel the dividing wall being slightly lower to accommodate this. The central portion is drawn to a dome shape for structural rigidity and appearance, and for draining droplets of liquid collecting thereunder back into the vessel along the sides. An ornate handle 70 is secured on the top thereof for manipulating the cover. Although the cover can be made of heat-treated glass, generally referred to as "Pyrex," or of steel or aluminum, it is preferred to make it of stainless steel to the shape shown in Fig. 2 for the purposes already mentioned. If Pyrex glass is used, such is of low heat conductivity and permits the user to observe the progress of cooking without removing the cover and causing a resulting cooling.

In operation, either one or both of the vessels are filled about half full with cold cooking oil, either of an animal or a vegetable base, the line cord is plugged into a convenient outlet, and the dial is turned in a clockwise direction from "Off" position to the temperature setting prescribed by the recipe. This closes the contacts 36 and carries the fixed contact to its critical position. Visual inspection through the holes 66 will indicate that the heater is "on" and in operation because the radiant glow employed for the thermostat can be seen also as light through the openings 66.

Within a few minutes the oil is melted and as its temperature rises, the glow coil establishes an anticipating surplus of heat in the bimetal element of the thermostat. This increment of surplus or differential heat is immediately acquired and remains constant when and as long as the glow coil is on. However, because of the edgewise position of the bimetal to the glow coil the arrangement restricts or controls the effective heat absorption by the bimetal. The bimetal whose temperature is established thereby is above the temperature of the other surrounding parts and, because of this, radiates a certain amount of heat to them which is being absorbed by it from the glow coil. A balance point is reached where further absorption is balanced by radiation loss. Thereafter this increment of heat is maintained as a differential above the temperature of the vessel.

This temperature differential in the bimetal is directly related to the high heat present in the heater, which high heat continues to be expended by the heater for a little while after it is turned off.

Then when the composite temperature of the thermostat reaches a predetermined point above the actual temperature immediately present in the vessel and the oil, it will open to break the circuit through the glow coil and the heater.

The initial darkening of the glow coil will inform the user that the oil is ready for cooking and the heater will continue to expend heat and will run out of appreciable excess heat about the time the temperature of the heater or vessel equals or slightly exceeds the desired temperature. However, extra concentration of heat in the walls where the heater element is located, particularly the walls 16 and 17 and the corners of each end thereof, will continue awhile longer to maintain convective circulation of cooled oil against the wall 18 of the vessel in the direction indicated by the arrows 71 in Fig. 6.

Starting in the bottom of each well the oil moves away and upwardly from the common wall 18 to absorb heat from the wall portions having the heater therein, then across the top of the body of oil, in and through any food being cooked, back towards and down the wall 18. This circulation of cooled oil towards the wall 18 at a point adjacent to the thermostat end of the wall 18 is augmented by the preponderance of heat present in the wall 15 and at the corners of the vessel at the ends of the wall 15. The hottest portion of a Calrod heater is generally in the middle of it and this with the lesser metal per lineal inch of a heater present at the corners provides a preponderant effect circulating the cooling oil, or a significant portion thereof, to come into intimate heat exchange contact with the wall 18 proximate to the thermostat. Furthermore, the cylindrical bottoms of the respective wells contribute to this path of circulation to assure that the temperature of the vessel walls to which the thermostat is responsive is essentially that of the coolest portion of the oil in either or both vessels. Moreover, this circulation is also assisted by the incline of the front and back walls of both vessels over their lower portion, there being no offset shelves present at these points.

Thus the area of the wall immediately around the thermostat is the first to begin to be cooled below a predetermined point. However, in the meantime the bimetal is radiating more heat than it is absorbing after the glow coil cools and the slightest fall in temperature of the adjacent vessel wall will be enough to bring the thermostat to its contact closing limit, whereupon the contacts are again closed, the heat is turned on, and the glow coil again readies the bimetal for its next upper limit cutoff in its cycle.

This cycle will repeat itself again and again, maintaining the temperature of the fat within a couple of degrees of any desired temperature until the cooking operation is completed.

In the event that the user desires to use the oil in only one of the wells, the oil in the other well becomes a source of stored heat, with the circulation indicated by the arrow 71 augmented by the fact that the oil adjacent to the wall 18 gives up its heat, is thereby cooled, and drops down and around to pick up more heat from the heated portion of the walls.

However, on the side of the wall where the cooking is being done, the wall 18 insofar as sensible heat is concerned, becomes a heating wall, since its heat is higher than the work-cooled oil on the cooking side thereof. With this stabilizing effect of the stored heat in the unused vessel, the upper and lower limits of the thermostat becomes less significant in the maintenance of heat at a constant temperature with respect to the danger of over-shooting the temperature limit. The working oil is maintained at a constant temperature in view of the stabilizing temperature of the unused oil.

On the other hand, if fat is only placed in one vessel, for single use, and the other vessel is left empty, the forced convective circulation in the working vessel is augmented by the wall 18 not only being a cold wall but a wall which also radiates heat from the working vessel, in which case the anticipating effect of the thermostat becomes a more important factor, yet is capable of maintaining a substantially constant temperature in the working oil. The metal stock of the dry vessel, however, will not rise to any dangerous levels because it is radiating heat into the air for the heat to be carried away rather than stored in oil directly adjacent thereto, and since the heat of the oil determines the degree of operation of the heater by the thermostat in the working vessel, the temperature of the dry vessel or dry walls will keep pace with the temperature of the hot oil without rising to any dangerous height.

Presuming that it is desired to remove the oil, the device is set on an elevated shelf or support, a pan is placed under the valve nozzles 62 and the valves opened. The fat drains, leaving the solid residue in the bottom of the vessels, and if need be, the vessels can be tilted enough to drain the remaining fat without disturbing the solid residue before it cools. Thereafter, the residue can be removed with little loss of cooling oil merely by wiping out the wells and the vessel is then ready for repeated use.

It will also be noted that no oil can drain down inside the housing, where it might come into contact with the glow coil or heater ends. The overlap arrangement at the upper edge of the vessel and the housing prevents it. This overlap engagement is maintained tight by the compressive force exerted by the screws 52.

Having thus described the invention and a certain embodiment thereof, it will be readily apparent to those skilled in the art, how the objects mentioned are accomplished and how various and further modifications and changes may be made without departing from the spirit of the invention, the scope of which is commensurate with the appended claims.

What is claimed is:

1. An electric deep fat fryer comprising a vessel for cooking oil formed of a metal of high heat conductivity and having four vertical side walls of cast thickness defining a deep cooking space within, an electric heater embedded in the walls adjacent their lower edge and extending with continuity around a major portion of the perimeter of said well to leave the center of the well heater-free, a cross wall dividing the vessel into two wells, a thermostat for controlling the operation of said heater in relationship to the melting point of the cooking oil and mounted on a wall having a heater therein at the end of said cross wall in heat-exchange relationship therewith, a boss on said vessel at one end of each well in close proximity to said heater to derive heat therefrom quickly, said bosses having drain openings, and valve means connected to said drain openings by a heat conducting element for draining said vessel at the melting point of the cooking oil.

2. An electric deep fat fryer comprising a deep cooking vessel for fat, which cooking vessel is formed with four vertical walls of cast thickness of a metal of high heat conductivity, a crosswall dividing the vessel into two wells, the bottom of said wells being rounded in a direction transverse the length of the well, a unitary electric heater embedded in the four vertical walls above the lower limit of said rounded bottom and extending with continuity around the perimeter of the vessel to leave the rounded bottoms heater-free in their center portions, the ends of said heater terminating short of encompassing the vessel to leave a substantial but minor portion of said vertical wall of the vessel free of said heater at one end of the crosswall, and a thermostat for controlling the operation of said heater, said thermostat being mounted in intimate heat-conducting relationship with said vessel at the end of said crosswall in heat-exchange relationship with said minor portion of said wall which is heater-free.

3. An electric deep fat fryer comprising a deep cooking vessel for fat, which cooking vessel is formed with four vertical walls of cast thickness of a metal of high heat conductivity, a crosswall dividing the vessel into two wells, the bottom of said wells being rounded in a direction transverse the length of the well, a unitary electric heater embedded in the four vertical walls above the lower limit of said rounded bottom and extending with continuity around the perimeter of the vessel to leave the rounded bottoms heater-free in their center portions, the ends of said heater terminating short of encompassing the vessel to leave a substantial but minor portion of said vertical wall of the vessel free of said heater at one end of the crosswall, and a thermostat for controlling the operation of said heater, said thermostat being mounted in intimate heat-conducting relationship with said vessel at the end of said crosswall in heat-exchange relationship with said minor portion of said wall which is heater-free, and means for draining the wells at the bottom of said rounded bottoms below said heater.

References Cited in the file of this patent

UNITED STATES PATENTS

| | | |
|---|---|---|
| 2,597,695 | Braski | May 20, 1952 |
| 2,629,042 | Burleyson | Feb. 17, 1952 |